United States Patent
Kim et al.

(10) Patent No.: US 8,331,423 B2
(45) Date of Patent: Dec. 11, 2012

(54) RELAYING APPARATUS AND METHOD IN WIRELESS COMMUNICATION SYSTEM

(75) Inventors: Eun-Yong Kim, Hwaseong-si (KR); Ju-Mi Lee, Seoul (KR); Tak-Ki Yu, Yongin-si (KR); Sang-Min Lee, Seoul (KR); Sung-Soo Kim, Seoul (KR); Joo-Hwan Chun, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 921 days.

(21) Appl. No.: 12/384,177

(22) Filed: Apr. 1, 2009

(65) Prior Publication Data

US 2009/0252080 A1    Oct. 8, 2009

(30) Foreign Application Priority Data

Apr. 2, 2008    (KR) .......................... 10-2008-0030676

(51) Int. Cl.
*H04B 7/17*    (2006.01)

(52) U.S. Cl. ........ 375/211; 375/212; 375/213; 375/214; 375/219; 375/220; 370/312; 370/315; 370/328; 370/352; 455/7; 455/11.1; 455/13.1; 455/15

(58) Field of Classification Search ................. 375/211, 375/212, 213, 214, 219, 220; 370/312, 315, 370/328, 352; 455/7, 11.1, 13.1, 15
See application file for complete search history.

(56) References Cited

U.S. PATENT DOCUMENTS 7,920,501 B2 *    4/2011    Larsson et al. ................ 370/315
8,126,033 B2 *    2/2012    Jung et al. ..................... 375/211

* cited by examiner

*Primary Examiner* — Leon Flores

(57) ABSTRACT

Provided are an apparatus and a method for providing a relay service in a wireless communication system. The apparatus includes a modulator, an encoder, and a transmission unit. The modulator modulates a transmission signal according to a modulation degree. The encoder encodes a modulation symbol provided from the modulator using a convolution code of a ring domain. The transmission unit transmits the signal provided from the encoder to a relay station. The relay station detects a signal where signals received from different transmission ends are added in a real domain, and relays the detected signal, thereby providing a relay service without an additional time resource.

20 Claims, 12 Drawing Sheets

RELAYING APPARATUS AND METHOD IN WIRELESS COMMUNICATION SYSTEM

CROSS-REFERENCE TO RELATED APPLICATION(S) AND CLAIM OF PRIORITY

The present application claims priority under 35 U.S.C. §119 to an application filed in the Korean Intellectual Property Office on Apr. 2, 2008 and assigned Serial No. 10-2008-0030676, the contents of which are incorporated herein by reference.

TECHNICAL FIELD OF THE INVENTION

The present invention relates generally to an apparatus and a method for providing a relay service in a wireless communication system, and, in particular, to an apparatus and a method for providing a relay service without an additional time resource in a wireless communication system.

BACKGROUND OF THE INVENTION

A wireless communication system provides a relay service in order to increase an entire link performance of two nodes exchanging information. That is, a wireless communication system relays a signal exchanged by the two nodes using a relay station. Here, the two nodes exchanging the information include a terminal and another terminal, or a terminal and a base station.

In the case where a Time Division Duplex wireless communication system provides a relay service, a relay station transmits a signal provided from a first node to a second node. After that, the relay station transmits a signal provided from the second node to the first node.

Since the Time Division Duplex wireless communication system supports a relay service using four times the independent time resources as described above, the Time Division Duplex wireless communication system requires two-times as many time resources as a case where two nodes directly perform communication. Therefore, the wireless communication system provides a relay service as illustrated in FIG. 1 in order to reduce an additional time resource caused by a relay service.

FIG. 1 illustrates the construction for providing a relay service in a conventional wireless communication system. In the following description, a relay station relays information between a terminal and another terminal.

As illustrated in FIG. 1, a wireless communication system includes a terminal_1 100, a terminal_2 110, and a relay station 120.

The terminal_1 100 transmits a signal, to be transmitted to the terminal_2 110, to the relay station 120 via a first time resource (in step 131). Also, the terminal_2 110 transmits a signal, to be transmitted to the terminal_1 100, to the relay station 120 via the first time resource (in step 131). At this point, the terminal_1 100 and the terminal_2 110 multiply a transmission signal by a reciprocal of channel information with the relay station 120, and transmit the same to the relay station 120.

The relay station 120 detects a signal where signals provided from the terminal_1 100 and the terminal_2 110 have been added.

After that, the relay station 120 transmits the detected signal to the terminal_1 100 and the terminal_2 110 via a second time resource (in step 133).

The terminal_1 100 determines a signal transmitted by the terminal_2 110 by removing a signal that terminal_1 100 has transmitted to the relay station 120 via the first time resource from a signal provided from the relay station 120. Also, the terminal_2 110 determines a signal transmitted by the terminal_1 100 by removing a signal which the terminal_2 110 has transmitted to the relay station 120 via the first time resource from a signal provided from the relay station 120.

In the case where nodes exchanging information transmit a signal to a relay station using the same time resource, the relay station detects a signal of the form where transmission signals of the two nodes have been added. In this case, linearity of codewords for signals that the nodes exchanging information transmit to the relay station should be guaranteed in a real domain.

However, when a modulation degree is raised in order to raise transmission capacity, linearity of codewords for signals which the nodes exchanging information transmit to the relay station cannot be guaranteed in the real domain. Accordingly, the relay station of the wireless communication system cannot detect a signal of the form where transmission signals of nodes exchanging information have been added.

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to provide an apparatus and a method for providing a relay service without an additional time resource in a wireless communication system.

Another object of the present invention is to provide an apparatus and a method for encoding a signal to be transmitted to a relay station using a convolution code that uses a modulation degree at a transmission end of a wireless communication system providing a relay service.

Still another object of the present invention is to provide an apparatus and a method for detecting sum of signals received from at least two nodes by performing a modulo operation that applies modulation degrees at a relay station of a wireless communication system providing a relay service.

According to an aspect of the present invention, a transmission apparatus of a wireless communication system using a relay service includes: a modulator for modulating a signal to be transmitted to a different node exchanging information via the relay service using a modulation degree by a channel environment; an encoder for encoding a modulation symbol provided from the modulator using a convolution code of a ring domain; and a transmission unit for transmitting the encoded signal provided from the encoder to a relay station.

According to another aspect of the present invention, a transmission apparatus of a wireless communication system using a relay service includes: a reception unit for receiving at least two signals transmitted from at least two nodes via a same time resource; a codeword generator for generating a codeword of a reception signal by performing a modulo operation that uses a modulation degree on the reception signal where the at least two signals received from the reception unit via the same time resource are added; a decoder for generating a modulation symbol of the reception signal by decoding the codeword generated by the codeword generator using a convolution code of a ring domain; and a transmission unit for transmitting the modulation symbol generated by the decoder to the at least two nodes.

According to still another aspect of the present invention, a method for transmitting a signal at a transmission end of a wireless communication system that uses a relay service includes: generating a modulation symbol by modulating a signal to be transmitted to a different node exchanging information via the relay service using a modulation degree by a channel environment; encoding the modulation symbol using a convolution code of a ring domain; and transmitting the encoded modulation symbol to a relay station.

According to yet another aspect of the present invention, a method for relaying a signal at a relay station of a wireless communication system that uses a relay service includes: when at least two signals transmitted by at least two nodes are received via a same time resource, generating a codeword of a reception signal by performing a modulo operation that uses a modulation degree on the reception signal where the at least two signals are added; generating a modulation symbol of the reception signal by decoding the codeword using a convolution code of a ring domain; and transmitting the modulation symbol to the at least two nodes.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2A through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide technology for providing a relay service without using an additional time resource in a wireless communication system. Here, the relay service means a service relaying a signal transmitted/received between nodes exchanging information via a relay station. At this point, the relay station can relay a signal transmitted/received between a terminal and another terminal, or relay a signal transmitted/received between a base station and a terminal. Though the following description is made on the assumption that the relay station relays a signal transmitted/received between a terminal and another terminal, a signal transmitted/received between a base station and a terminal can be relayed similarly.

Also, the following description is made on the assumption that a wireless communication system uses an Orthogonal Frequency Division Multiplexing (OFDM) scheme. The present invention can be similarly applied to the case where the wireless communication system uses a different communication scheme.

To allow the wireless communication system to provide a relay service without an additional time resource, each of a terminal_1 and a terminal_2 transmits a signal to a relay station via a first time resource. After that, the relay station relays the signals provided from terminal_1 and terminal_2 via a second time resource.

Figure 1:
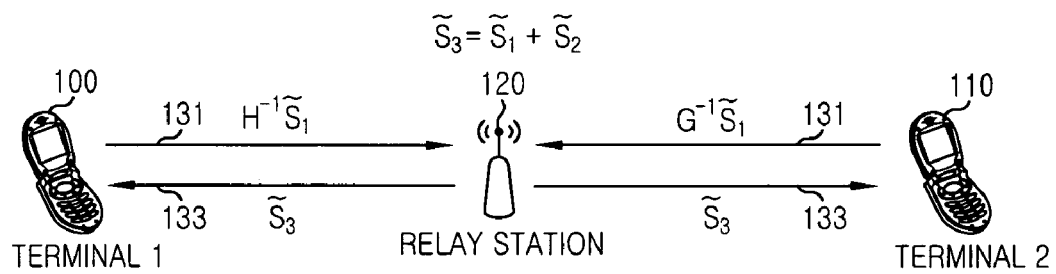
FIG. 1 illustrates the construction for providing a relay service in a conventional wireless communication system.
Figure 2A:
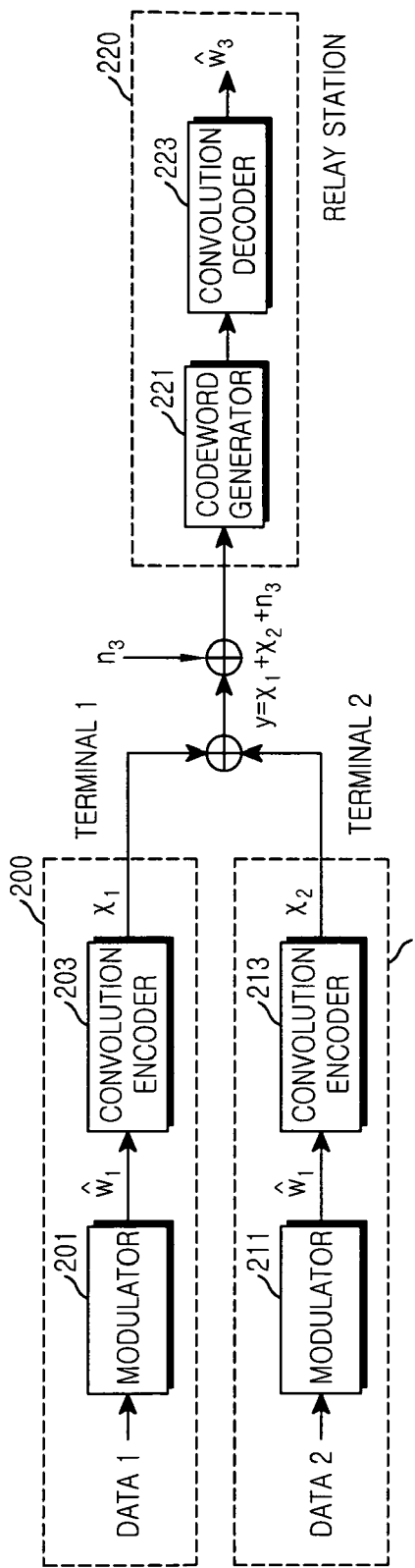
FIGS. 2A and 2B illustrate block diagrams for providing a relay service in a wireless communication system according to an exemplary embodiment of the present invention.
Figure 2B:
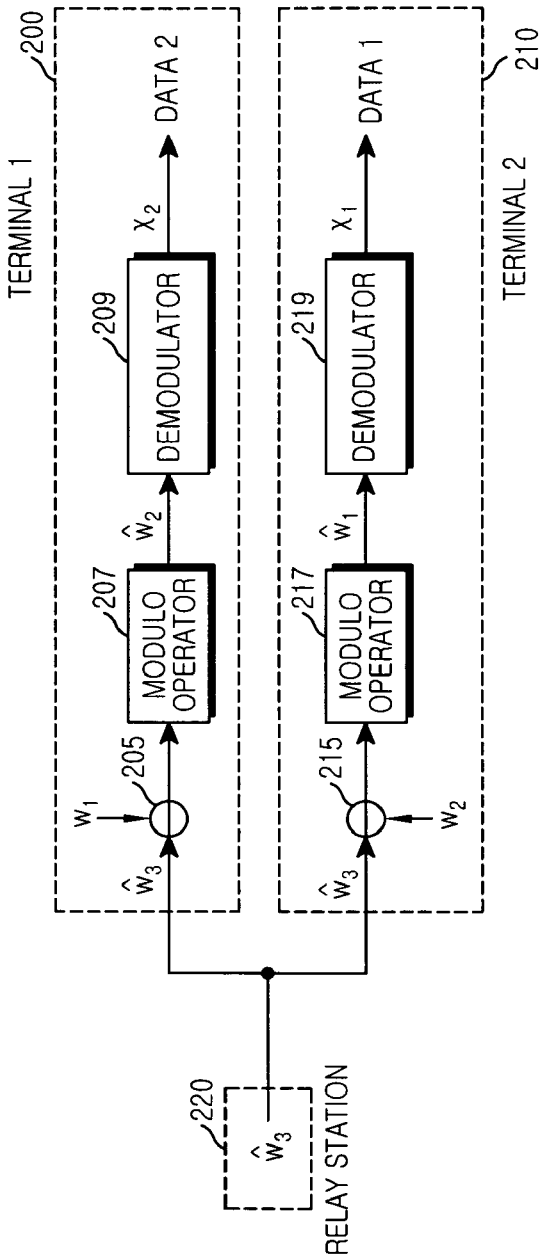

In this case, the relay station does not separate signals received from terminal_1 and terminal_2 via the same time resource but detects a signal of the form where the signals are added. Therefore, terminal_1 and terminal_2 encode a signal to be transmitted to the relay station, as illustrated in FIGS. 2A and 2B, such that a signal detected by the relay station becomes a codeword. That is, each of terminal- and the terminal_2 encodes a modulation symbol to be transmitted to the relay station using a convolution code that uses a modulation degree, as illustrated in FIGS. 2A and 2B.

FIGS. 2A and 2B illustrate the block diagram for providing a relay service in a wireless communication system according to an exemplary embodiment of the present invention.

FIG. 2A illustrates a block diagram when each of a terminal_1 200 and another terminal_2 210 transmits a signal to a relay station 220. FIG. 2B illustrates a block diagram when the relay station 220 transmits a signal to terminal_1 200 and terminal_2 210.

As illustrated in FIG. 2A, terminal_1 200 transmits data_1 to be transmitted to terminal_2 210 to the relay station 220 during a first time resource. For example, terminal_1 200 includes a modulator 201 and a convolution encoder 203.

The modulator 201 modulates the data_1 to be transmitted to terminal_2 210 according to a predetermined modulation degree. Here, the modulation degree is determined depending on a channel environment.

The convolution encoder 203 encodes a modulation symbol provided from the modulator 201 using a convolution code that considers a modulation degree of the modulator 201. Here, the convolution code means a code of a ring domain for convolution encoding, turbo encoding, and Low Density Parity Check (LDPC) encoding.

The terminal_2 210 transmits data_2 to be transmitted to terminal_1 200 to the relay station 220 during the first time resource. In one embodiment, terminal_2 210 includes a modulator 211 and a convolution encoder 213.

The modulator 211 modulates data_2 to be transmitted to terminal_1 200 according to a predetermined modulation degree. Here, the modulation degree is determined depending on a channel environment. At this point, the modulator 211 can use the same modulation degree as that of the modulator 201 of terminal_1 200.

The convolution encoder 213 encodes a modulation symbol provided from the modulator 211 using a convolution code which considers the modulation degree of the modulator 211.

The relay station 220 detects signals provided from terminal_1 200 and terminal_2 210 of the form where data_1 and data_2 received from terminal_1 200 and terminal_2 210 are added via a first time resource. At this point, since each of terminal_1 200 and terminal_2 210 transmits a symbol stream formed by a channel encoder having linearity in a ring domain, the relay station 220 can detect a signal of the form where the data_1 and the data_2 are added.

In one example, the relay station 220 includes a codeword generator 221 and a convolution decoder 223.

The codeword generator 221 generates a codeword of a signal where data_1 and data_2 are added by performing a modulo operation that uses modulation degrees of the modulators 201 and 211 from terminals 200 and 210, respectively. For example, the codeword generator 221 generates a hard decision value of a codeword to be provided to the convolution decoder 223 by performing the modulo operation that uses the modulation degrees of the modulators 201 and 211. For another example, the codeword generator 221 generates a soft decision value of a codeword to be provided to the convolution decoder 223 by performing the modulo operation that uses the modulation degrees of the modulators 201 and 211.

The convolution decoder 223 decodes the codeword provided from the codeword generator 221 using a convolution code that considers the modulation degrees of the modulators 201 and 211 forming the terminals 200 and 210, respectively. At this point, the convolution decoder 223 generates a modulation symbol $\hat{w}_3$ of a signal where the data_1 and the data_2 are added in a ring domain by decoding the codeword provided from the codeword generator 221.

As illustrated in FIG. 2B, the relay station 220 transmits the modulation symbol $\hat{w}_3$ generated by the convolution decoder 223 to the terminal_1 200 and the terminal_2 210 via a second time resource.

The terminal_1 200 determines the data_2 transmitted by the terminal_2 210 using the modulation symbol $\hat{w}_3$ provided from the relay station 220 and a modulation symbol $w_1$ of the data_1 transmitted via the first time resource.

For example, the terminal_1 200 includes a signal detector 205, a modulo operator 207, and a demodulator 209.

The signal detector 205 detects a signal transmitted by terminal_2 210 by removing the modulation symbol $w_1$ of the data_1 transmitted via the first time resource from the modulation symbol $\hat{w}_3$ provided from the relay station 220.

The modulo operator 207 generates a modulation symbol $\hat{w}_2$ of the data_2 by performing a modulo operation on the signal detected by the signal detector 205. At this point, the modulo operator 207 performs the modulo operation on the detected signal using the modulation degree of the modulator 201.

The demodulator 209 determines the data_2 by demodulating the modulation symbol $\hat{w}_2$ of the data_2 provided from the modulo operator 207.

The terminal_2 210 determines the data_1 transmitted by terminal_1 200 using the modulation symbol $\hat{w}_3$ provided from the relay station 220 and the modulation symbol $\hat{w}_2$ of the data_2 transmitted via the first time resource.

For example, the terminal_2 210 includes a signal detector 215, a modulo operator 217, and a demodulator 219.

The signal detector 215 detects a signal transmitted by the terminal_1 200 by removing the modulation symbol $w_2$ of the data_2 transmitted via the first time resource from the modulation symbol $\hat{w}_3$ provided from the relay station 220.

The modulo operator 217 generates a modulation symbol $\hat{w}_1$ of the data_1 by performing a modulo operation on the signal detected by the signal detector 215. At this point, the modulo operator 217 performs the modulo operation on the detected signal using the modulation degree of the modulator 211.

The demodulator 219 determines the data_1 by demodulating the modulation symbol $\hat{w}_1$ of the data_1 provided from the modulo operator 217.

As described above, each of terminal_1 200 and terminal_2 210 encodes a modulation symbol using a convolution code that considers a modulation degree of a corresponding modulator in order to guarantee the linearity of a codeword. At this point, a transmission end of each of terminal_200 and terminal_2 210 can have a construction, as illustrated in FIG. 3.

Figure 3:
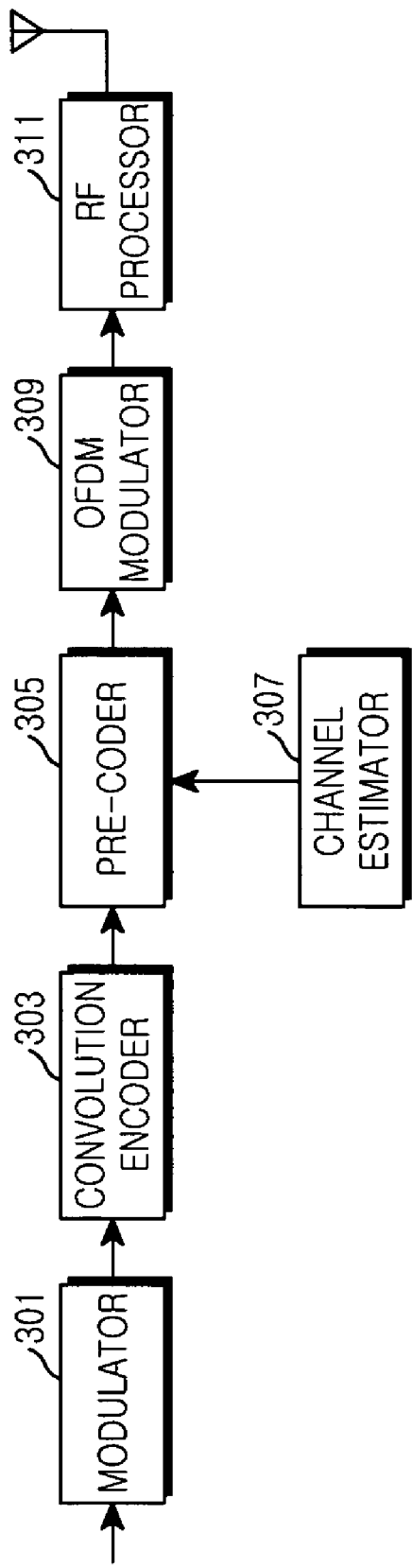
FIG. 3 illustrates a transmission end for transmitting a signal in a wireless communication system according to an exemplary embodiment of the present invention.

FIG. 3 illustrates a transmission end for transmitting a signal in a wireless communication system according to an exemplary embodiment of the present invention.

Referring to FIG. 3, the transmission end includes a modulator 301, a convolution encoder 303, a pre-coder 305, a channel estimator 307, an OFDM modulator 309, and a Radio Frequency (RF) processor 311.

The modulator 301 modulates a transmission signal according to a predetermined modulation degree.

The convolution encoder 303 encodes a modulation symbol provided from the modulator 301 using a convolution code that considers the modulation degree of the modulator 301. That is, the convolution encoder 303 encodes a modulation symbol, not a binary signal. For example, the convolution encoder 303 encodes a modulation symbol using a convolution code of a ring domain for convolution encoding, turbo encoding, and LDPC encoding which consider the modulation degree of the modulator 301.

The pre-coder 305 pre-encodes an encoded signal provided from the convolution encoder 303 using inverse channel information of a channel with the relay station provided from the channel estimator 307, and outputs the same.

The channel estimator 307 estimates a channel with the relay station and provides the estimated channel to the pre-coder 305.

The OFDM modulator 309 converts the pre-encoded signal provided from the pre-coder 305 into a signal in a time domain by performing Inverse Fast Fourier Transform (IFFT), and outputs the same.

The RF processor 311 converts a baseband signal provided from the OFDM modulator 309 into an RF signal, and transmits the RF signal to the relay station via an antenna.

Hereinafter, the construction of a relay station relaying a signal detected in the form where data received from a terminal_1 and a terminal_2 via the same time resource are added will be described.

Figure 4:
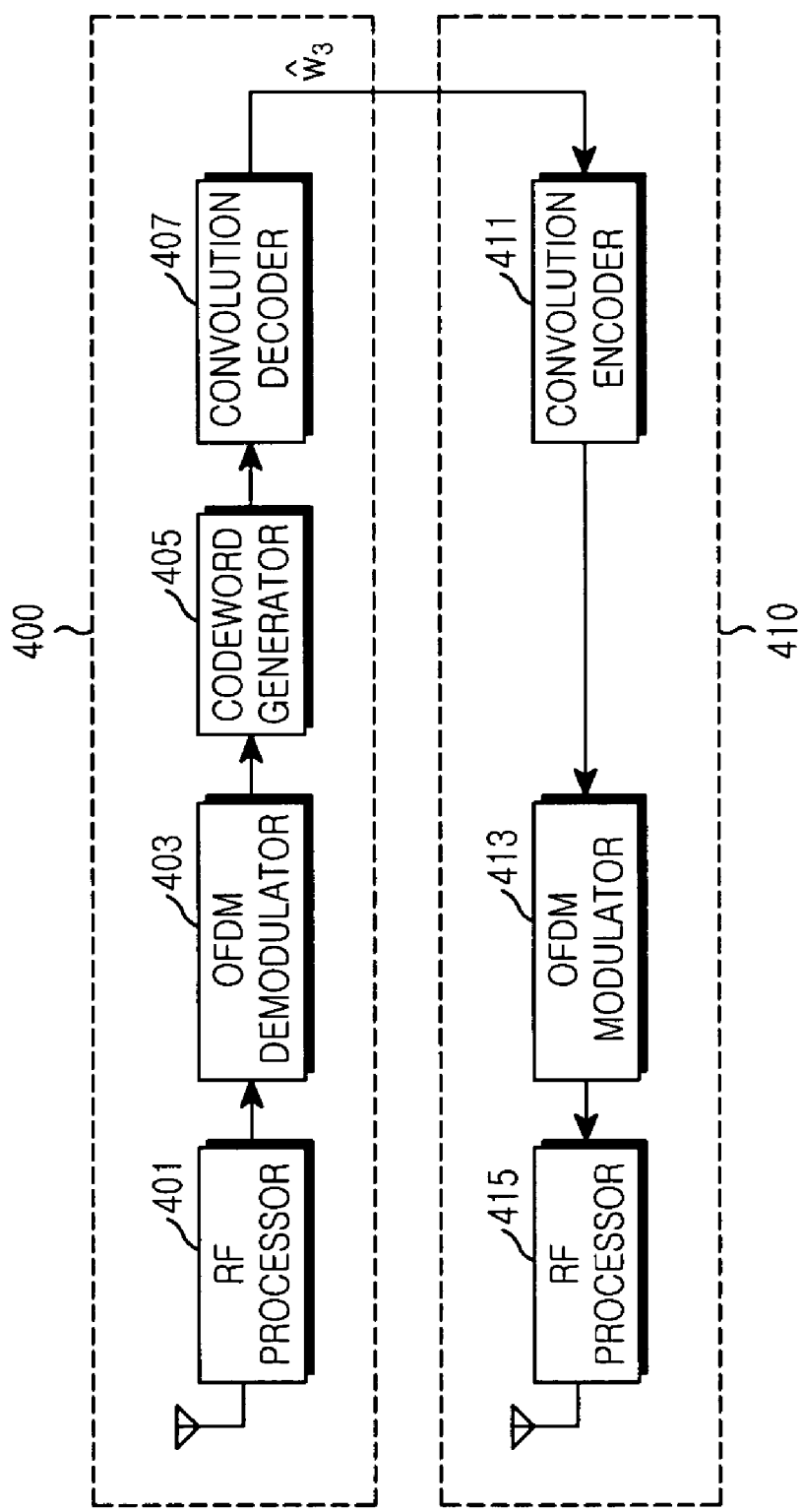
FIG. 4 illustrates a relay station for relaying a signal in a wireless communication system according to an exemplary embodiment of the present invention.

FIG. 4 illustrates a relay station for relaying a signal in a wireless communication system according to an exemplary embodiment of the present invention.

Referring to FIG. 4, the relay station includes a receiver 400 and a transmitter 410.

The receiver 400 includes an RF processor 401, an OFDM demodulator 403, a codeword generator 405, and a convolution decoder 407.

The RF processor 401 converts RF signals provided from the terminal_1 and the terminal_2 via an antenna into baseband signals. At this point, the RF processor 401 converts RF signals of the form where signals received from the terminal_1 and the terminal_2 are added into baseband signals.

The OFDM demodulator 403 converts a signal provided from the RF processor 401 into a signal in a frequency domain by performing Fast Fourier Transform (FFT).

The codeword generator 405 generates a codeword of a signal provided from the OFDM demodulator 403 by performing a modulo operation which uses the modulation degrees used for the terminal_1 and the terminal_2 to modulate a transmission signal. For example, the codeword generator 405 generates a hard decision value of a codeword of a signal provided from the OFDM demodulator 403 by performing the modulo operation which uses the modulation degrees.

For another example, the codeword generator 405 generates a soft decision value of a codeword of a signal provided from the OFDM demodulator 403 by performing the modulo operation which uses the modulation degrees. In this case, the codeword generator 405 should calculate a plurality of soft decision values for each symbol because an information bit is not a binary number. For example, in the case where each of the terminal 1 and the terminal 2 transmits a signal using a modulation degree of 4-Pulse Amplitude Modulation (PAM), symbols of the form where data of the terminal_1 and the terminal_2 received by the relay station are added can have values of $\{0, 1, 2, 3, 4, 5, 6\}$. At this point, the codeword generator 405 can calculate one value from $\{0, 1, 2, 3\}$ by performing a modulo operation that uses modulation degrees. Accordingly, the codeword generator 405 calculates soft decision values of $\{0,1\},\{0,2\},\{0,3\},\{1,2\},\{1,3\}$, and $\{2,3\}$. Here, the soft decision values represent log likelihood ratios which the codeword generator 405 calculates using Equation 1 below.

$$LLR\left(\frac{x=i}{x=j}\right) = -4\frac{E_s}{N_o}\left(y - \left(\frac{x_i^{max} + x_j^{max}}{2}\right)\right) \cdot \left(\frac{x_i^{max} - x_j^{max}}{2}\right) \quad \text{[Eqn. 1]}$$

where x is one of symbols generated through a modulo operation, $E_s$ is strength of a reception signal, $N_o$ is strength of a noise, and $x_i^{max}$ is a value of symbol values serving as i that is closest to a reception signal when a modulo operation using a modulation degree is performed on values $x_R$ which a symbol of a reception signal can have. For example, in the case where a reception signal is 4.8 and i is 0, 1, 2, and 3 when a 4PAM modulation scheme is used, $x_i^{max}$ can be represented by Equations 2A-D below.

$$x_0^{max} = \underset{x_R \in \{0,4\}}{\operatorname{argmin}} |x_R - y| = 4. \quad \text{[Eqn. 2A]}$$

$$x_1^{max} = \underset{x_R \in \{1,5\}}{\operatorname{argmin}} |x_R - y| = 5. \quad \text{[Eqn. 2B]}$$

$$x_2^{max} = \underset{x_R \in \{2,6\}}{\operatorname{argmin}} |x_R - y| = 6. \quad \text{[Eqn. 2C]}$$

$$x_3^{max} = \underset{x_R \in \{3\}}{\operatorname{argmin}} |x_R - y| = 3 \quad \text{[Eqn. 2D]}$$

where $x_R$ are values which a symbol of a reception signal provided from a relay station can have, and y is a reception signal.

The convolution decoder 407 decodes a codeword provided from the codeword generator 405 using a convolution code which considers modulation degrees used for the terminal_1 and the terminal_2 to modulate a transmission signal. At this point, the convolution decoder 407 generates a modulation symbol $\hat{w}_3$ of a signal where signals received from the terminal_1 and the terminal_2 are added in a ring domain by decoding a codeword provided from the codeword generator 405.

The transmitter 410 includes a convolution encoder 411, an OFDM modulator 413, and an RF processor 415.

The convolution encoder 411 encodes a modulation symbol provided from the convolution decoder 407 of the receiver 400 using a convolution code that considers modulation degrees determined according to channel information with the terminal_1 and the terminal_2. Here, the modulation degrees are the same as those used for the terminal_1 and the terminal_2 to modulate a transmission signal.

The OFDM modulator 413 converts the encoded signal provided from the convolution encoder 411 into a signal in a time domain by performing IFFT.

The RF processor 415 converts the signal in the time domain provided from the OFDM modulator 413 into an RF signal, and transmits the RF signal to the terminal_1 and the terminal_2 via an antenna.

As described above, the relay station transmits a signal to be relayed to the terminal_1 and the terminal_2 via the second time resource. At this point, a reception end of each of the terminal_1 and the terminal_2 can have a construction illustrated in FIG. 5 in order to detect a signal transmitted by the other terminal exchanging information from a signal provided from the relay station.

Figure 5:
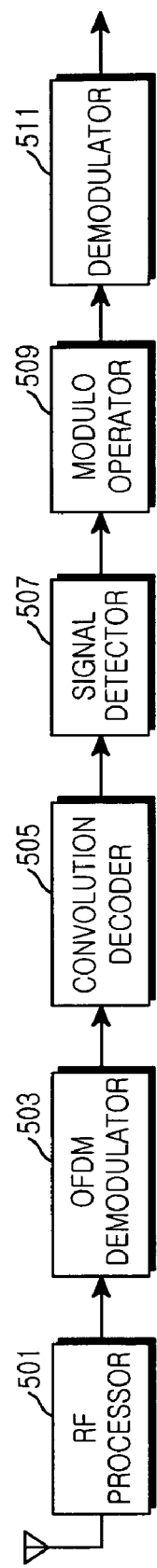
FIG. 5 illustrates a reception end for receiving a signal in a wireless communication system according to an exemplary embodiment of the present invention.

FIG. 5 illustrates a reception end for receiving a signal in a wireless communication system according to an exemplary embodiment of the present invention.

Referring to FIG. 5, the reception end includes an RF processor 501, an OFDM demodulator 503, a convolution decoder 505, a signal detector 507, a modulo operator 509, and a demodulator 511.

The RF processor 501 converts an RF signal received from the relay station via an antenna into a baseband signal.

The OFDM demodulator 503 converts the baseband signal provided from the RF processor 501 into a signal in a frequency domain by performing FFT.

The convolution decoder 505 decodes a signal provided from the OFDM demodulator 503 using a convolution code which considers a modulation degree. At this point, the convolution decoder 505 generates a modulation symbol $\hat{w}_3$ of a signal transmitted by the relay station by decoding a signal provided from the OFDM demodulator 503. Here, the modulation degree is a modulation degree used for the terminal to modulate a signal transmitted to the relay station during a first time resource.

The signal detector 507 detects a signal to be received from the other terminal exchanging information using the modulation symbol provided from the convolution decoder 505 and a modulation symbol transmitted to the relay station during the first time resource. For example, the signal detector 507 detects a signal to be received from the other terminal exchanging information by adding the modulation symbol provided from the convolution decoder 505 and the modulation symbol transmitted to the relay station during the first time resource.

The modulo operator 509 determines a modulation symbol of a signal transmitted by the other terminal exchanging information by performing a modulo operation that uses a modulation degree on the signal detected by the signal detector 507. Here, the modulation degree is a modulation degree used for the terminal to modulate the signal transmitted to the relay station during the first time resource.

The demodulator 511 recovers a signal transmitted by the other terminal exchanging information by demodulating the modulation symbol provided from the modulo operator 509.

In the above exemplary embodiment, the relay station encodes the modulation symbol $\hat{w}_3$ of a signal where signals received from the terminal_1 and the terminal_2 are added in a ring domain during the same time resource using a convolution code, and transmits the encoded modulation symbol to the terminal_1 and the terminal_2 during the second time resource.

In another exemplary embodiment, the relay station can transform the modulation symbol $\hat{w}_3$ of the signal where signals received from the terminal_1 and the terminal_2 are added in a ring domain during the same time resource using a binary signal, and transmit the transformed modulation symbol to the terminal- and the terminal_2 during the second time resource. In this case, the relay station can have a construction as illustrated in FIG. 6.

Figure 6:
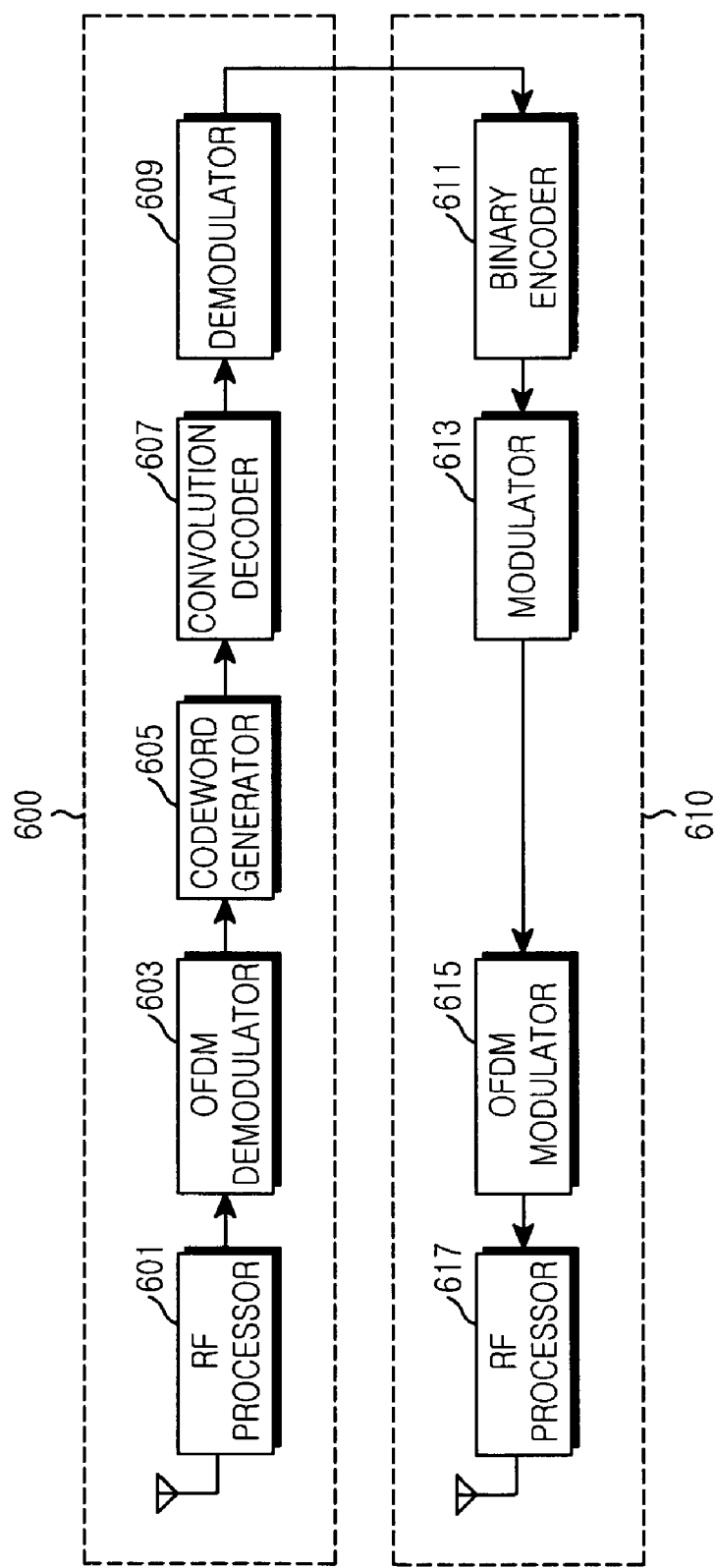
FIG. 6 illustrates a relay station for relaying a signal in a wireless communication system according to another exemplary embodiment of the present invention.

FIG. 6 illustrates a relay station for relaying a signal in a wireless communication system according to another exemplary embodiment of the present invention.

Referring to FIG. 6, the relay station includes a receiver 600 and a transmitter 610.

The receiver 600 includes an RF processor 601, an OFDM demodulator 603, a codeword generator 605, a convolution decoder 607, and a demodulator 609.

The RF processor 601 converts RF signals provided from the terminal_1 and the terminal_2 via an antenna into baseband signals. At this point, the RF processor 601 converts RF signals of the form where signals received from the terminal_1 and the terminal_2 are added into baseband signals.

The OFDM demodulator 603 converts a signal provided from the RF processor 601 into a signal in a frequency domain by performing FFT.

The codeword generator 605 generates a codeword of a signal provided from the OFDM demodulator 603 by performing a modulo operation which uses the modulation degrees used for the terminal_1 and the terminal_2 to modulate a transmission signal. For example, the codeword generator 605 generates a hard decision value of a codeword of a signal provided from the OFDM demodulator 603 by performing the modulo operation which uses the modulation degrees. For another example, the codeword generator 605 generates a soft decision value of a codeword of a signal provided from the OFDM demodulator 603 by performing the modulo operation which uses the modulation degrees.

The convolution decoder 607 decodes the codeword provided from the codeword generator 605 using a convolution code which considers modulation degrees used for the terminal_1 and the terminal_2 to modulate a transmission signal. At this point, the convolution decoder 607 generates a modulation symbol of a signal where signals received from the terminal_1 and the terminal_2 are added in a ring domain by decoding the codeword provided from the codeword generator 605.

The demodulator 609 generates a binary signal for a signal where signals received from the terminal_1 and the terminal_2 are added in a ring domain by demodulating the modulation symbol provided from the convolution decoder 607 using the modulation degrees used for the terminal_1 and the terminal_2 to modulate a transmission signal.

The transmitter 610 includes a binary encoder 611, a modulator 613, an OFDM modulator 615, and an RF processor 617.

The binary encoder 611 encodes the binary signal provided from the demodulator 609 using a binary code generated through Galois Field (GF).

The modulator 613 modulates the encoded signal provided from the binary encoder 611 according to modulation degrees. At this point, the modulator 613 modulates the encoded signal provided from the binary encoder 611 using the modulation degrees determined according to channel information with the terminal_1 and the terminal_2.

The OFDM modulator 615 converts a signal provided from the modulator 613 into a signal in a time domain by performing IFFT.

The RF processor 617 converts the signal provided from the OFDM modulator 615 into an RF signal, and transmits the RF signal to the terminal_1 and the terminal_2 via an antenna.

As described above, the relay station transmits a signal to be relayed to the terminal_1 and the terminal_2 via the second time resource. At this point, a reception end of each of the terminal_1 and the terminal_2 can have a construction as illustrated in FIG. 7 in order to detect a signal transmitted by the other terminal exchanging information from a signal provided from the relay station.

Figure 7:
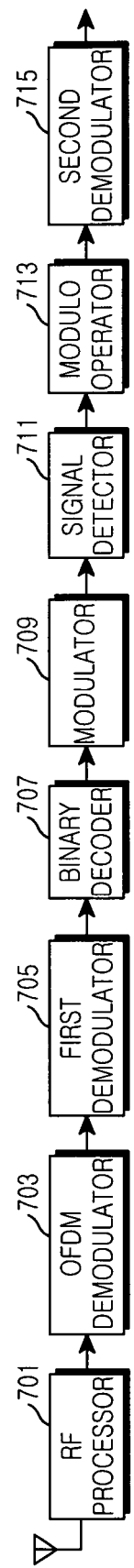
FIG. 7 illustrates a reception end for receiving a signal in a wireless communication system according to another exemplary embodiment of the present invention.

FIG. 7 illustrates a reception end for receiving a signal in a wireless communication system according to another exemplary embodiment of the present invention.

Referring to FIG. 7, the reception end includes an RF processor 701, an OFDM demodulator 703, a first demodulator 705, a binary decoder 707, a modulator 709, a signal detector 711, a modulo operator 713, and a second demodulator 715.

The RF processor 701 converts an RF signal received from the relay station via an antenna into a baseband signal.

The OFDM demodulator 703 converts a signal provided from the RF processor 701 into a signal in a frequency domain by performing FFT.

The first demodulator 705 demodulates a signal provided from the OFDM demodulator 703.

The binary decoder 707 decodes the demodulated signal provided from the first demodulator 705 using a binary code generated through GF.

The modulator 709 generates a modulation symbol by modulating the decoded signal provided from the binary decoder 707. At this point, the modulation symbol generated by the modulator 709 is the same as the modulation symbol of a signal where signals received from the terminal_1 and the terminal_2 are added in a ring domain, generated by the convolution decoder 607 of the relay station.

The signal detector 711 detects a signal to be received from the other terminal exchanging information using the modulation symbol provided from the modulator 709 and the modulation symbol transmitted to the relay station during the first time resource.

The modulo operator 713 determines a modulation symbol of a signal transmitted by the other terminal exchanging information by performing a modulo operation that uses a modulation degree on the signal detected by the signal detector 711. Here, the modulation degree is the same as a modulation degree used by the modulator 709.

The second demodulator 715 recovers the signal transmitted by the other terminal exchanging information by demodulating the modulation symbol provided from the modulo operator 713.

Hereinafter, an operating method of a transmission end, for encoding a modulation symbol using a convolution code which considers a modulation degree of a modulator and transmitting the encoded modulation symbol to a relay station in order to guarantee linearity of a codeword in a terminal_1 and a terminal_2 will be described.

Figure 8:
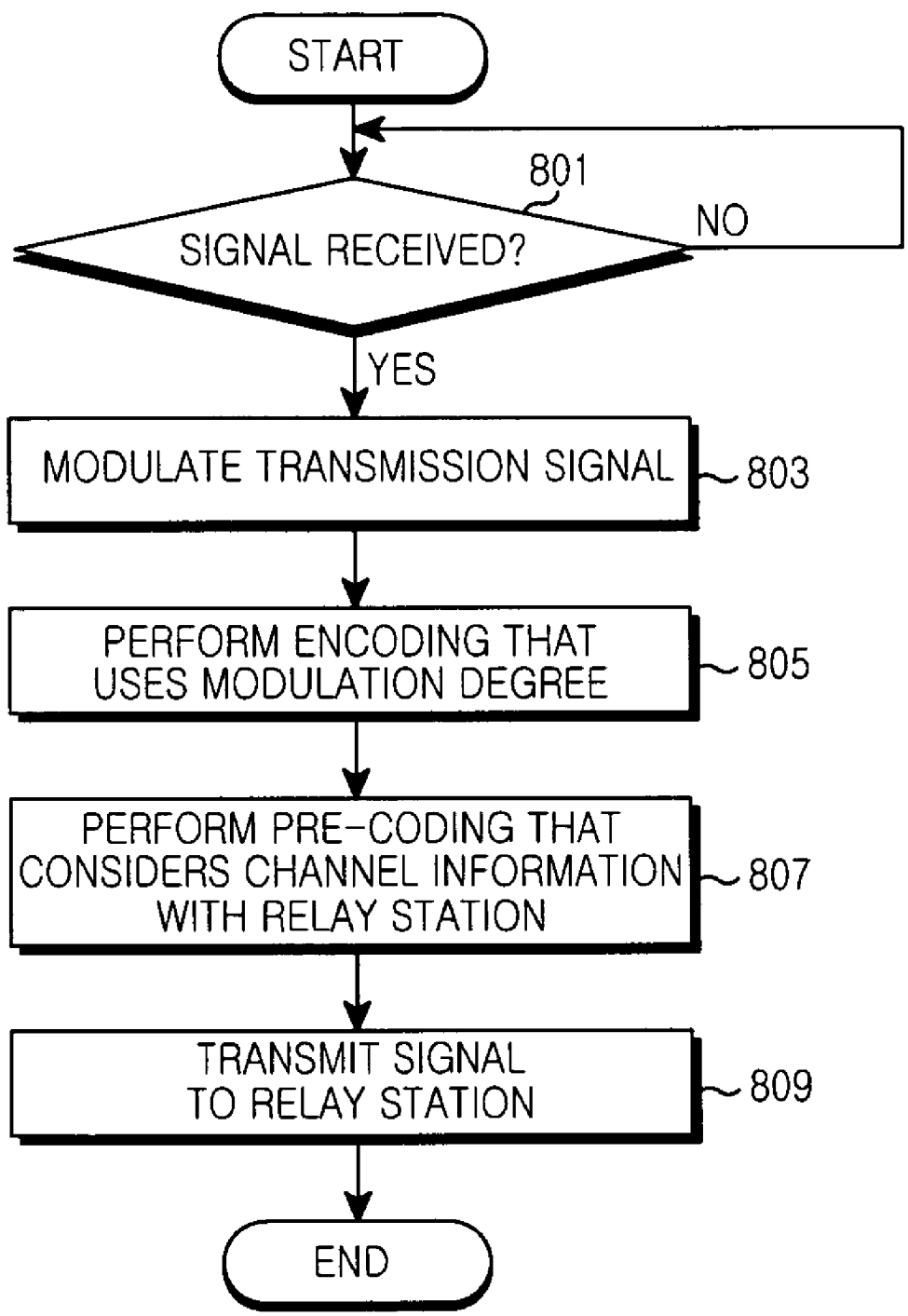
FIG. 8 illustrates a procedure for transmitting a signal in a wireless communication system according to an exemplary embodiment of the present invention.

FIG. 8 illustrates a procedure for transmitting a signal in a wireless communication system according to an exemplary embodiment of the present invention.

Referring to FIG. 8, in step 801, a transmission end determines whether to transmit a signal to the other terminal exchanging information.

In case of transmitting a signal, in step 803, the transmission end modulates the signal to be transmitted to the other terminal exchanging information according to a predetermined modulation degree. Here, the modulation degree is determined according to channel information with the relay station.

After modulating the signal to be transmitted (transmission signal), in step 805, the transmission end encodes a corresponding modulation symbol using a convolution code which considers the modulation degree. Here, the convolution code is a convolution code of a ring domain for convolution encoding, turbo encoding, LDPC encoding which consider a modulation degree.

After encoding the modulation symbol, in step 807, the transmission end pre-encodes the encoded transmission signal using inverse channel information of a channel with the relay station.

After pre-encoding the transmission signal, in step 809, the transmission end transmits the pre-encoded transmission signal to the relay station. For example, in case of transmitting a signal, the transmission end converts the pre-encoded transmission signal into a signal in a time domain by performing IFFT. After that, the transmission end converts the signal in the time domain into an RF signal, and transmits the RF signal to the relay station via an antenna.

Thereafter, the transmission end can terminate the present.

Figure 9:
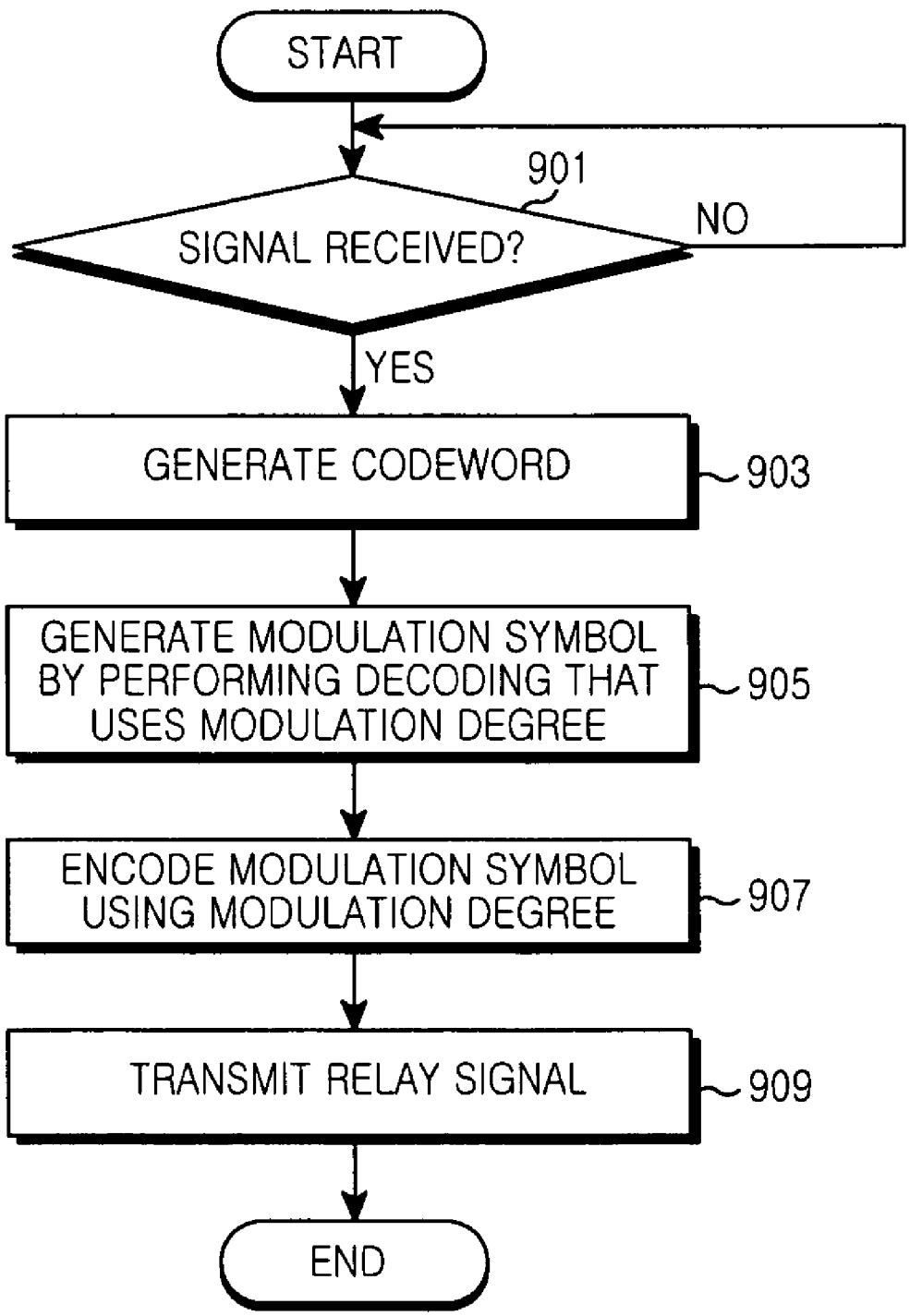
FIG. 9 illustrates a procedure for relaying a signal in a wireless communication system according to an exemplary embodiment of the present invention.

In the case where the terminal_1 and the terminal_2 transmit a signal via the same time resource as described above, the relay station detects a signal of the form where signals received from the terminals_1 and _2 are added as illustrated in FIG. 9.

FIG. 9 illustrates a procedure for relaying a signal in a wireless communication system according to an exemplary embodiment of the present invention.

Referring to FIG. 9, in step 901, a relay station determines whether signals are received from a terminal_1 and a terminal_2. At this point, the relay station receives a signal of the form where signals received from the terminal_1 and the terminal_2 via the same time resource are added.

When signals are received from the terminals, in step 903, the relay station generates a codeword of the received signal by performing a modulo operation that uses modulation degrees. For example, the relay station generates a hard decision value of a codeword for the signal where the signals received from the terminal_1 and the terminal_2 are added by performing a modulo operation that uses modulation degrees. For another example, the relay station generates a soft decision value of a codeword for the signal where the signals received from the terminal_1 and the terminal_2 are added by performing a modulo operation that uses the modulation degrees. Here, the relay station performs the modulo operation using the same modulation degrees as the modulation degrees used for the terminal- and the terminal_2 to modulate a transmission signal.

After generating the codeword, in step 905, the relay station generates a modulation symbol by decoding the codeword using a convolution code that considers the modulation degrees. That is, the relay station generates the modulation symbol of a signal where signals received from the terminal_1 and the terminal_2 are added in a ring domain by performing the decoding that uses the convolution code.

After that, in step 907, the relay station encodes the modulation symbol using a convolution code which considers the modulation degrees.

After encoding the modulation symbol, in step 909, the relay station transmits the encoded modulation symbol to the terminal_1 and the terminal_2. For example, in case of transmitting a signal, the relay station converts the encoded modulation symbol into a signal in a time domain by performing IFFT. After that, the relay station converts the signal in the time domain into an RF signal, and transmits the RF signal to the terminals.

Thereafter, the relay station terminates the present process.

As described above, the relay station transmits a signal to be relayed to the terminal_1 and the terminal_2 via the second time resource. At this point, a reception end of each of the terminal_1 and the terminal_2 can operate, as illustrated in FIG. 10 in order to detect a signal transmitted by the other terminal exchanging information from a signal provided from the relay station.

Figure 10:
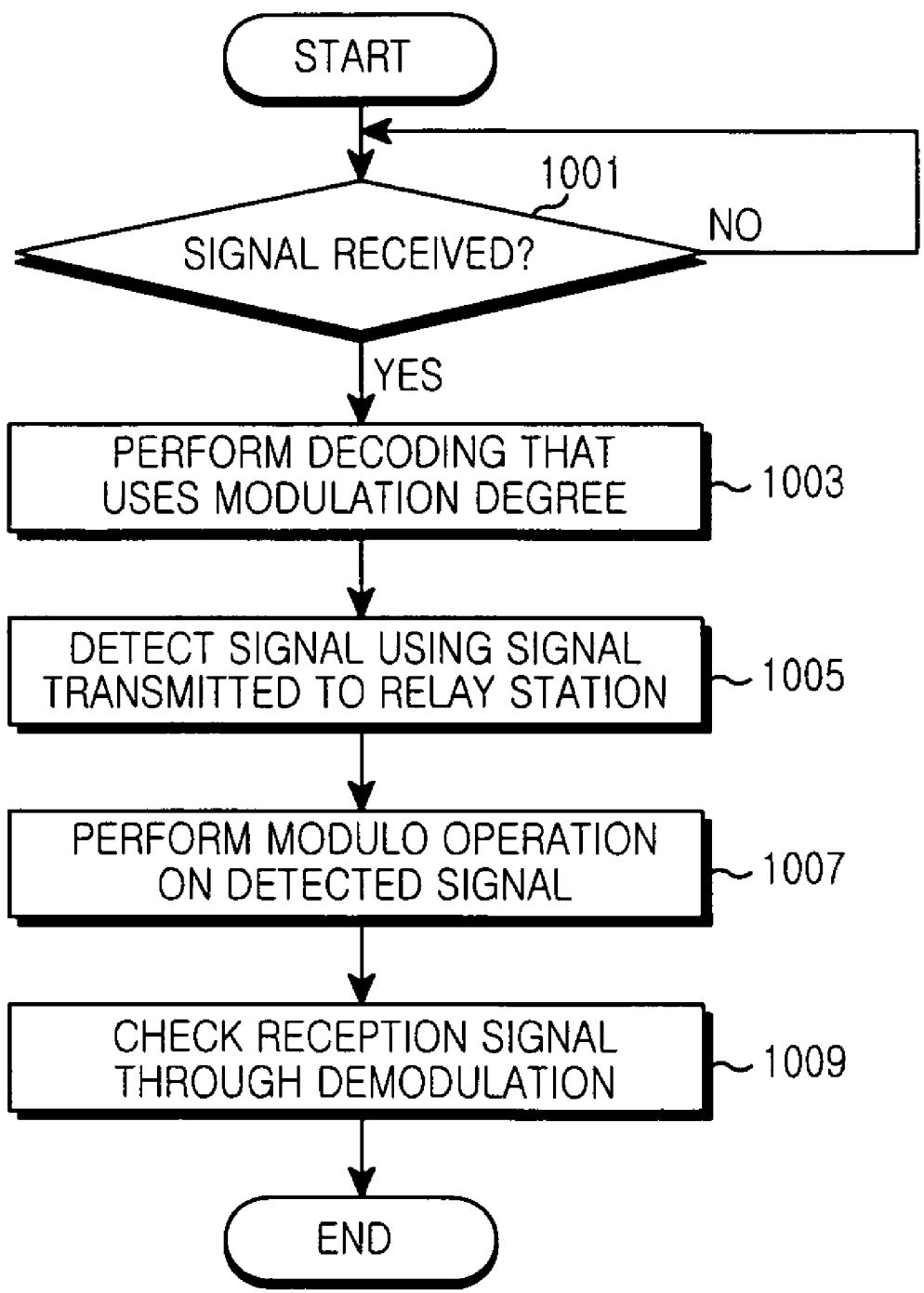
FIG. 10 illustrates a procedure for receiving a signal in a wireless communication system according to an exemplary embodiment of the present invention.

FIG. 10 illustrates a procedure for receiving a signal in a wireless communication system according to an exemplary embodiment of the present invention.

Referring to FIG. 10, in step 1001, the reception end determines whether a signal is received from the relay station.

When a signal is received from the relay station, in step 1003, the reception end generates a modulation symbol by decoding the received signal provided from the relay station using a convolution code that uses a modulation degree. Here, the modulation degree is the same as the modulation degree used for the terminal to modulate a signal transmitted to the relay station during a first time resource.

After generating the modulation symbol, in step 1005, the reception end detects a signal to be received from the other terminal exchanging information using the generated modulation symbol and a modulation symbol transmitted to the relay station during the first time resource. For example, the reception end detects the signal to be received from the other terminal exchanging information by adding the generated modulation symbol and the modulation symbol transmitted to the relay station during the first time resource.

After detecting the signal, in step 1007, the reception end determines a modulation symbol of a signal transmitted by the other terminal exchanging information by performing a modulo operation which uses a modulation degree of the detected signal. Here, the reception end performs the modulo operation using the same modulation degree as the modulation degree used for decoding the received signal.

After determining the modulation symbol, in step 1009, the reception end determines the signal transmitted by the other terminal exchanging information by demodulating the modulation symbol.

Thereafter, the reception end terminates the present algorithm.

In the above exemplary embodiment, the relay station encodes a modulation symbol $\hat{w}_3$ of a signal where signals received from the terminal_1 and the terminal_2 are added in a ring domain during the same time resource using a convolution code, and transmits the encoded modulation symbol to the terminal_1 and the terminal_2 during the second time resource.

In another exemplary embodiment, the relay station can transform the modulation symbol $\hat{w}_3$ of the signal where signals received from the terminal_1 and the terminal_2 are added in a ring domain during the same time resource using a binary signal, and transmit the transformed modulation symbol to the terminal_1 and the terminal 2 during the second time resource. In this case, the relay station operates as illustrated in FIG. 11.

Figure 11:
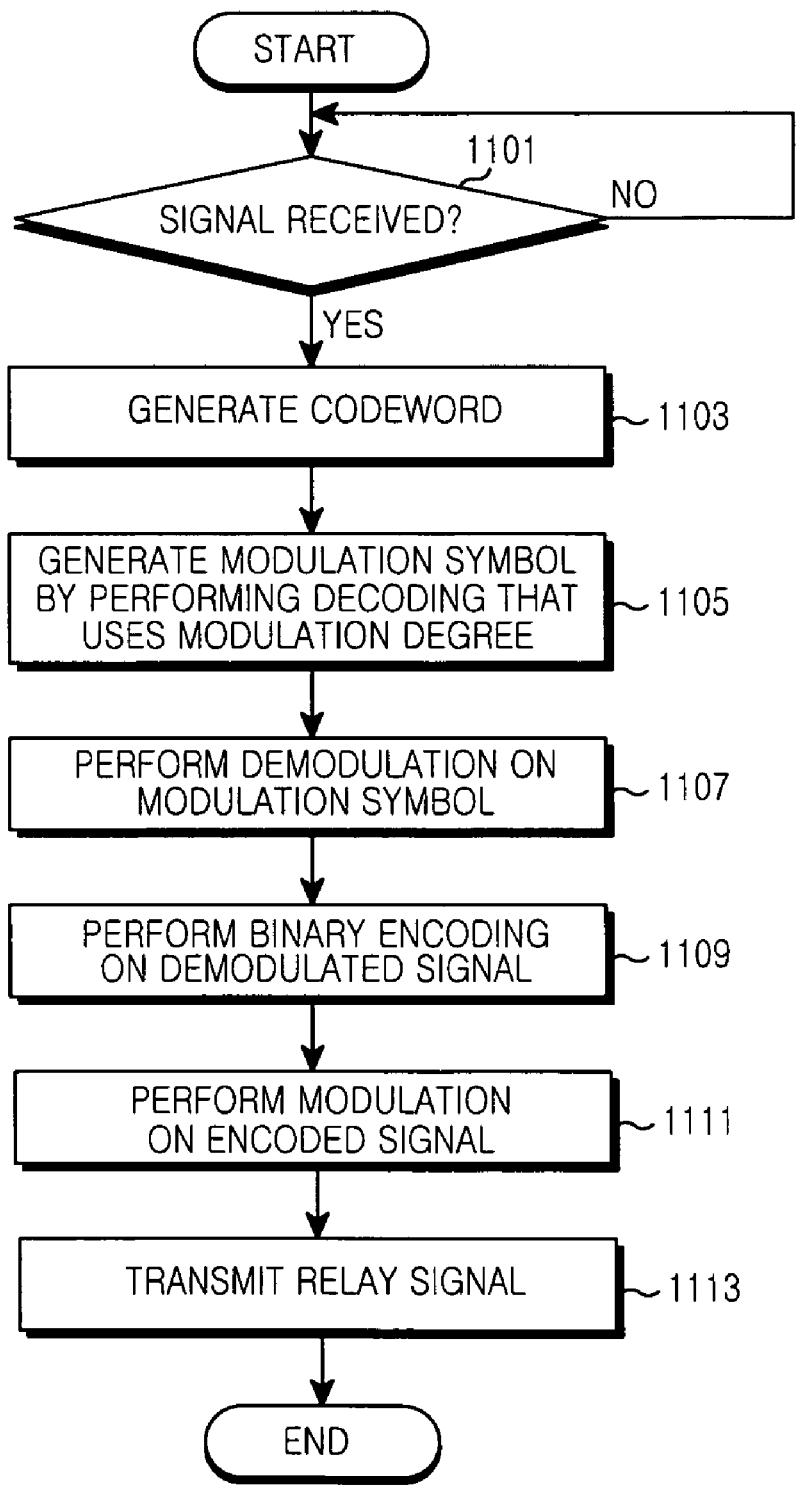
FIG. 11 illustrates a procedure for relaying a signal in a wireless communication system according to another exemplary embodiment of the present invention.

FIG. 11 illustrates a procedure for relaying a signal in a wireless communication system according to another exemplary embodiment of the present invention.

Referring to FIG. 11, in step 1101, a relay station determines whether signals are received from a terminal- and a terminal_2. At this point, the relay station receives a signal of the form where signals received from the terminal_1 and the terminal_2 via the same time resource are added.

When signals are received from the terminals, in step 1103, the relay station generates a codeword of the received signal by performing a modulo operation that uses modulation degrees. For example, the relay station generates a hard decision value of a codeword for a signal where signals received from the terminal_1 and the terminal_2 are added by performing the modulo operation that uses the modulation degrees. For another example, the relay station generates a soft decision value of a codeword for a signal where signals received from the terminal_1 and the terminal_2 are added by performing the modulo operation that uses the modulation degrees. Here, the relay station performs the modulo operation using the same modulation degrees as the modulation degrees used for the terminal_1 and the terminal_2 to modulate a transmission signal.

After generating the codeword, in step 1105, the relay station generates a modulation symbol by decoding the codeword using a convolution code that considers the modulation degrees. That is, the relay station generates the modulation symbol of a signal where signals received from the terminal_1 and the terminal_2 are added in a ring domain by performing decoding which uses the convolution code.

After generating the modulation symbol, in step 1107, the relay station generates a binary signal by demodulating the modulation symbol.

After that, in step 1109, the relay station encodes the binary signal generated in step 1107 using a binary code generated through GF.

After encoding the binary signal, in step 1111, the relay station modulates the binary signal encoded in step 1109.

After modulating the binary signal, in step 1113, the relay station transmits the modulated binary signal to the terminal_1 and the terminal_2. For example, in case of transmitting a signal, the relay station converts the modulated binary signal into a signal in a time domain by performing IFFT. After that, the relay station converts the signal in the time domain into an RF signal, and transmits the RF signal to the terminals.

Thereafter, the relay station terminates the present process.

As described above, the relay station transmits a signal to be relayed to the terminal_1 and the terminal_2 through the second time resource. At this point, a reception end of each of the terminal_1 and the terminal_2 can operate as illustrated in FIG. 12 in order to detect a signal transmitted by the other terminal exchanging information from a signal provided from the relay station.

Figure 12:
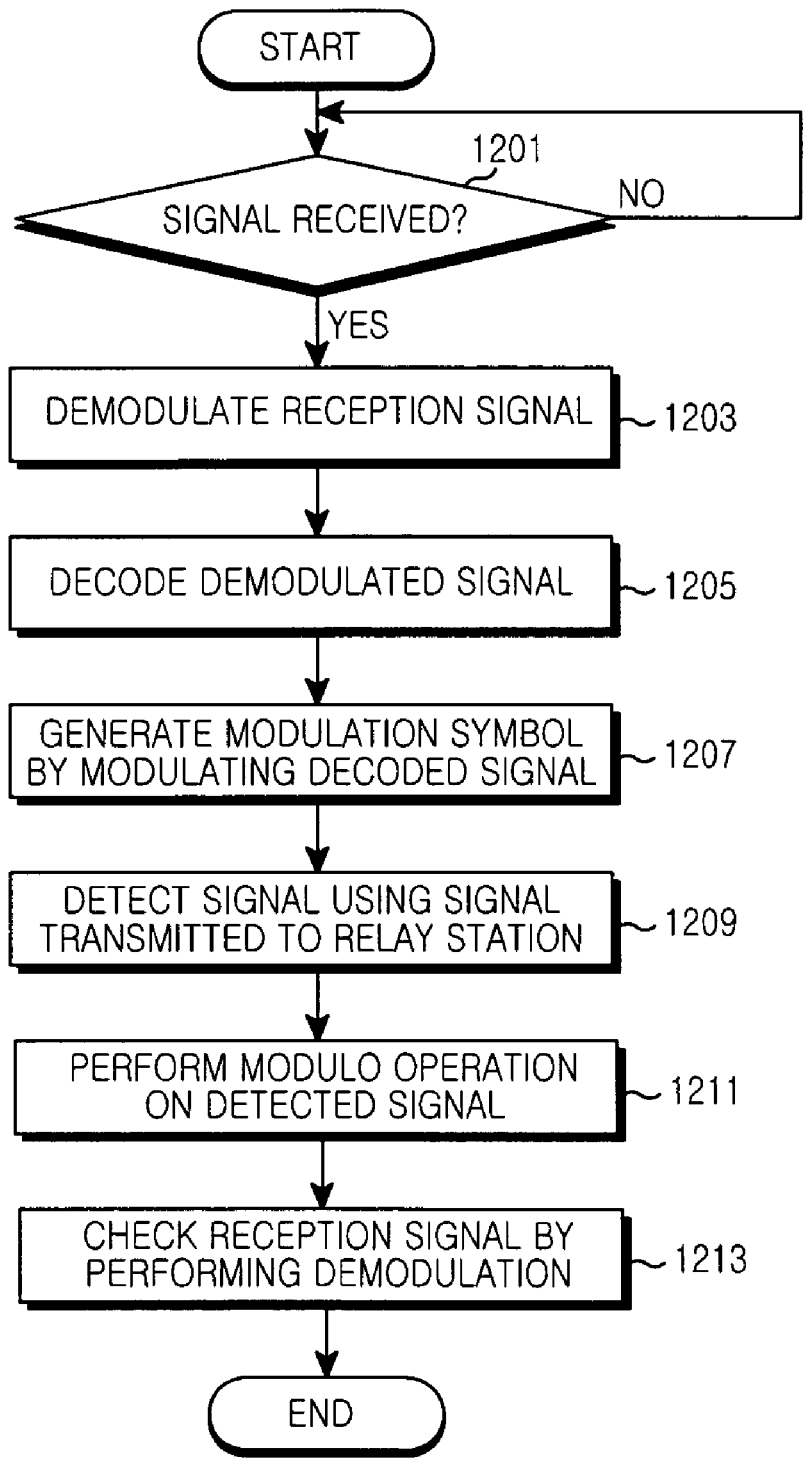
FIG. 12 illustrates a procedure for receiving a signal in a wireless communication system according to another exemplary embodiment of the present invention.

FIG. 12 illustrates a procedure for receiving a signal in a wireless communication system according to another exemplary embodiment of the present invention.

Referring to FIG. 12, in step 1201, the reception end determines whether a signal is received from the relay station.

When a signal is received from the relay station, in step 1203, the reception end demodulates the received signal provided from the relay station.

After demodulating the received signal, in step 1205, the reception end decodes the demodulated signal using a binary code generated through GF.

After that, in step 1207, the reception end generates a modulation symbol by modulating the decoded signal. At this point, the generated modulation symbol is the same as the modulation symbol of a signal where signals received from the terminal_1 and the terminal_2 are added in a ring domain, generated by the convolution decoder of the relay station.

After generating the modulation symbol, in step 1209, the reception end detects a signal to be received from the other terminal exchanging information using the generated modulation symbol and a modulation symbol transmitted to the relay station during a first time resource. For example, the reception end detects the signal to be received from the other terminal exchanging information by adding the generated modulation symbol and the modulation symbol transmitted to the relay station during the first time resource.

After detecting the signal, in step 1211, the reception end determines a modulation symbol of a signal transmitted by the other terminal exchanging information by performing a modulo operation which uses a modulation degree on the detected signal. Here, the reception end performs the modulo operation that uses the same modulation degree as the modulation degree used for decoding the received signal.

After determining the modulation symbol, in step 1213, the reception end determines a signal transmitted by the other terminal exchanging information by demodulating the modulation symbol.

Thereafter, the reception end terminates the present process.

As described above, a transmission end of a wireless communication system providing a relay service encodes a modulation symbol using a convolution code which uses a modulation degree and transmits the encoded modulation symbol to a relay station, so that the relay station detects a signal where signals provided from at least two nodes are added in a real domain, relays the detected signal, and can provide a relay service without an additional time resource.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A transmission apparatus of a wireless communication system configured to use a relay service, the apparatus comprising:
- a modulator configured to modulate a signal to be transmitted to a different node exchanging information via the relay service using a modulation degree by a channel environment;
- an encoder configured to encode a modulation symbol provided from the modulator using a convolution code of a ring domain according to the modulation degree; and
- a transmission unit configured to transmit the encoded signal provided from the encoder to a relay station.

2. The apparatus of claim 1, wherein the encoder is configured to encode the modulation symbol provided from the modulator using a convolution code of a ring domain for one of convolution encoding, turbo encoding, and Low Density Parity Check (LDPC) encoding.

3. The apparatus of claim 1, wherein the transmission unit comprises:
- an Orthogonal Frequency Division Multiplexing (OFDM) modulator configured to convert a signal provided from the encoder into a signal in a time domain by performing Inverse Fast Fourier Transform (IFFT); and
- a Radio Frequency (RF) processor configured to convert the signal in the time domain into an RF signal, and transmit the RF signal to the relay station via an antenna.

4. The apparatus of claim 1, further comprising a pre-coder configured to pre-encode an encoded signal provided from the encoder using an inverse channel of a channel with the relay station, and provide the pre-encoded signal to the transmission unit.

5. A relay station of a wireless communication system using a relay service, the relay station comprising:
- a reception unit configured to receive at least two signals transmitted from at least two nodes via a same time resource;
- a codeword generator configured to generate a codeword of a reception signal by performing a modulo operation which uses a modulation degree on the reception signal where the at least two signals received from the reception unit via the same time resource are added;
- a decoder configured to generate a modulation symbol of the reception signal by decoding the codeword generated by the codeword generator using a convolution code of a ring domain according to the modulation degree;
- a demodulator configured to demodulate the modulation symbol using the modulation degree; and
- a transmission unit configured to transmit the demodulated signal to the at least two nodes.

6. The apparatus of claim 5, wherein the reception unit comprises:
- an RF processor configured to convert an RF signal received via an antenna into a baseband signal;
- an OFDM demodulator configured to convert the baseband signal into a signal in a frequency domain by performing Fast Fourier Transform (FFT).

7. The apparatus of claim 5, wherein the codeword generator is configured to generate the codeword of the reception signal by performing the modulo operation which considers modulation degrees of the received signals on the reception signal of the form where the at least two signals received from the reception unit via the same time resource are added.

8. The apparatus of claim 5, wherein the codeword generator is configured to generate a hard decision value of the codeword by performing the modulo operation on the reception signal.

9. The apparatus of claim 5, wherein the codeword generator is configured to generate a soft decision value of the codeword by performing the modulo operation on the reception signal.

10. The apparatus of claim 5, wherein the transmission unit comprises:
- a modulator configured to generate a modulation symbol by modulating the demodulated signal;
- an OFDM modulator configured to convert the modulation symbol generated by the modulator into a signal in a time domain by performing IFFT; and
- an RF processor configured to convert the signal in the time domain provided from the OFDM modulator into an RF signal, and transmitting the RF signal to the nodes via an antenna.

11. A method for transmitting a signal at a transmission end of a wireless communication system which uses a relay service, the method comprising:
- generating a modulation symbol by modulating a signal to be transmitted to a different node exchanging information via the relay service using a modulation degree by a channel environment;
- encoding the modulation symbol using a convolution code of a ring domain according to the modulation degree; and
- transmitting the encoded modulation symbol to a relay station.

12. The method of claim 11, wherein the convolution code comprises a code of a ring domain for one of convolution encoding, turbo encoding, and LDPC encoding.

13. The method of claim 11, wherein the transmitting of the encoded modulation symbol comprises:
- converting the encoded modulation symbol into a signal in a time domain by performing IFFT; and
- converting the signal in the time domain into an RF signal, and transmitting the RF signal to the relay station via an antenna.

14. The method of claim 11, further comprising, after the encoding of the modulation symbol:
- pre-coding the encoded modulation symbol using an inverse channel of a channel with the relay station; and
- transmitting the pre-encoded signal to the relay station.

15. A method for relaying a signal at a relay station of a wireless communication system which uses a relay service, the method comprising:
- when at least two signals transmitted by at least two nodes are received via a same time resource, generating a codeword of a reception signal by performing a modulo operation which uses modulation degrees on the reception signal where the at least two signals are added;
- generating a modulation symbol of the reception signal by decoding the codeword using a convolution code of a ring domain according to the modulation degree;
- demodulating the modulation symbol using the modulation degree; and
- transmitting the demodulated signal to the at least two nodes.

16. The method of claim 15, further comprising, before the generating of the codeword:
   converting an RF signal received via an antenna into a baseband signal; and
   converting the baseband signal into a signal in a frequency domain by performing FFT.

17. The method of claim 15, wherein the generating of the codeword comprises generating the codeword of the reception signal by performing a modulo operation which considers modulation degrees of the received signals.

18. The method of claim 15, wherein the generating of the codeword comprises:
   generating the codeword of the reception signal by performing the modulo operation which uses the modulation degree; and
   generating a hard decision value of the codeword.

19. The method of claim 15, wherein the generating of the codeword comprises:
   generating the codeword of the reception signal by performing the modulo operation which uses the modulation degree; and
   generating a soft decision value of the codeword.

20. The method of claim 15, wherein the transmitting of the modulation symbol comprises:
   generating a modulation symbol by modulating the demodulated signal;
   converting the modulation symbol into a signal in a time domain by performing IFFT; and
   converting the signal in the time domain into an RF signal, and transmitting the RF signal to the at least two nodes via an antenna.

* * * * *